US010619299B2

(12) United States Patent
Sekiya et al.

(10) Patent No.: US 10,619,299 B2
(45) Date of Patent: Apr. 14, 2020

(54) CONTAMINATION INHIBITOR COMPOSITION (71) Applicant: MAINTECH CO., LTD., Tokyo (JP)

(72) Inventors: Hiroshi Sekiya, Tokyo (JP); Daisuke Kobayashi, Tokyo (JP); Hiraku Sawada, Fuji (JP); Shinichiro Ogoda, Fuji (JP); Kazuyuki Yusa, Fuji (JP)

(73) Assignee: MAINTECH CO., LTD., Tokyo (JP)

( * ) Notice: Subject to any disclaimer, the term of this patent is extended or adjusted under 35 U.S.C. 154(b) by 128 days.

(21) Appl. No.: 15/561,313

(22) PCT Filed: Mar. 25, 2016

(86) PCT No.: PCT/JP2016/001771
§ 371 (c)(1),
(2) Date: Sep. 25, 2017

(87) PCT Pub. No.: WO2016/157875
PCT Pub. Date: Oct. 6, 2016

(65) Prior Publication Data
US 2018/0100270 A1 Apr. 12, 2018

(30) Foreign Application Priority Data
Mar. 27, 2015 (JP) .................... 2015-067026

(51) Int. Cl.
*C08G 77/388* (2006.01)
*D21C 9/08* (2006.01)
(Continued)

(52) U.S. Cl.
CPC ............ *D21C 9/086* (2013.01); *C08G 77/04* (2013.01); *C08L 83/04* (2013.01); *C09D 183/04* (2013.01);
(Continued)

(58) Field of Classification Search
CPC ....... C08L 83/00; C08L 83/08; C08G 77/388; C08G 77/26
(Continued)

(56) References Cited

U.S. PATENT DOCUMENTS 4,715,931 A * 12/1987 Schellhamer .......... D21C 9/008
162/199
6,051,108 A * 4/2000 O'Neal, Jr. .............. D21F 1/32
134/3
(Continued)

FOREIGN PATENT DOCUMENTS

JP        H07-292382 A    11/1995
JP        2003-213587 A    7/2003
(Continued)

OTHER PUBLICATIONS

International Search Report of PCT/JP2016/001771 dated May 17, 2016.

*Primary Examiner* — Michael A Salvitti
(74) *Attorney, Agent, or Firm* — Muncy, Geissler, Olds & Lowe, P.C.

(57) ABSTRACT

To provide a contamination inhibitor composition capable of effectively inhibiting pitch contamination on a dry part.
The present invention is a contamination inhibitor composition 1 which is imparted to a dry part D of a paper-making machine, and comprising a film forming agent and a gelling agent, wherein the film forming agent is an emulsion consisting of water, a modified silicone and an emulsifier and the gelling agent is a compound represented by the following formula (1):

(Chemical Formula 1)

(1)

(Continued)

[in the formula (1), $R^1$ each independently represents a hydrogen atom, a hydroxyl group, a carboxyl group or a hydrocarbon group optionally having a substituent having 1 to 3 carbon atoms, $R^2$ each independently represents a hydroxyl group or a carboxyl group, $R^3$ represents a hydrogen atom, a hydroxyl group or a carboxyl group, m is an integer of 1 to 5, and n is an integer of 0 to 5.].

5 Claims, 2 Drawing Sheets

(51) Int. Cl.
    *D21F 5/00*     (2006.01)
    *C08G 77/04*     (2006.01)
    *C08L 83/04*     (2006.01)
    *C09D 183/04*     (2006.01)
    *C23F 11/14*     (2006.01)
    *D21H 21/02*     (2006.01)

(52) U.S. Cl.
    CPC ................ *C23F 11/14* (2013.01); *D21F 5/00* (2013.01); *D21H 21/02* (2013.01)

(58) Field of Classification Search
    USPC ...................... 524/266, 268; 525/477; 528/38
    See application file for complete search history.

(56) References Cited

U.S. PATENT DOCUMENTS

| | | | | |
|---|---|---|---|---|
| 8,500,900 | B2* | 8/2013 | Sugiura | C08L 83/06 106/287.13 |
| 9,005,394 | B2* | 4/2015 | Sekiya | D21H 17/13 162/48 |
| 9,458,572 | B2* | 10/2016 | Sekiya | D21H 17/59 |
| 2005/0194114 | A1* | 9/2005 | Weinstein | D21F 1/32 162/199 |
| 2006/0162888 | A1* | 7/2006 | Sekiya | D21F 1/30 162/199 |
| 2007/0066497 | A1* | 3/2007 | Morrison | C10M 173/025 508/208 |
| 2013/0053512 | A1* | 2/2013 | Kojima | C08G 77/04 524/588 |
| 2013/0126113 | A1* | 5/2013 | Tan | D21F 11/00 162/164.3 |
| 2013/0189889 | A1* | 7/2013 | Creutz | B65D 65/42 442/91 |
| 2014/0128521 | A1* | 5/2014 | Sekiya | D21H 17/59 524/114 |
| 2014/0206805 | A1* | 7/2014 | Sekiya | D21H 17/13 524/378 |
| 2017/0029748 | A1* | 2/2017 | Laser | C11D 11/0017 |
| 2018/0100270 | A1* | 4/2018 | Sekiya | D21F 5/00 |
| 2018/0257066 | A1* | 9/2018 | Morita | B01J 39/04 |
| 2019/0002804 | A1* | 1/2019 | Zou | C11D 11/0041 |

FOREIGN PATENT DOCUMENTS

| | | |
|---|---|---|
| JP | 4868628 B1 | 2/2012 |
| JP | 4868629 B1 | 2/2012 |
| JP | 2013-104133 A | 5/2013 |
| WO | 2011/105254 A1 | 9/2011 |

* cited by examiner

CONTAMINATION INHIBITOR COMPOSITION

TECHNICAL FIELD

The present invention relates to a contamination inhibitor composition, more particularly, relates to a contamination inhibitor composition capable of effectively inhibiting pitch contamination on a dry part.

BACKGROUND ART

A paper-making step in a paper-making machine generally has a wire part in which a dispersion of pulp in water is placed on a net (wire) for paper-making and excess water is allowed to drop naturally, to obtain a wet paper, a press part in which the wet paper is passed between a pair of press rolls and pressed by the press rolls via felt, thereby transferring water in the wet paper into the felt, to dehydrate the wet paper, a dry part in which the wet paper passed through the press part is dried by contacting with a cylinder heated, to give a paper, and a reel part in which the paper is wound on a rod called spool.

The dry part has apparatuses such as a cylinder for heating and drying the wet paper, a canvas for pressing the wet paper to the cylinder, a canvas roll for guiding the canvas, a calender roll for controlling the thickness and the smoothness of the wet paper dried, a breaker stack roll for mildly controlling the thickness and the smoothness of the wet paper dried, and has a problem that pitch adheres to the surfaces thereof. When pitch adheres to them, the paper is contaminated, causing a significant lowering in its yield.

In contrast, a silicone-based contamination inhibitor composition is known as a contamination inhibitor composition which can inhibit pitch contamination by imparting to a dry part.

As the silicone-based contamination inhibitor composition, for example, a contamination inhibitor composition containing a polysiloxane compound having a prescribed chemical structural formula in which the number of amino-modified groups per molecule of the polysiloxane compound is 0.5 to 5 is known (see, e.g., PTL 1).

With the above-described contamination inhibitor composition, however, the region wherein pitch contamination can be inhibited is limited to a site to which the contamination inhibitor composition is imparted in the dry part. Accordingly, it is necessary to impart the contamination inhibitor composition at several positions on the dry part.

For this purpose, a contamination inhibitor composition is known containing a low molecular polysiloxane compound having a prescribed chemical structural formula and a high molecular polysiloxane compound having a prescribed chemical structural formula in which the kinetic viscosity at 25° C. of the low molecular polysiloxane compound is 10 to 300 mm²/s and the kinetic viscosity at 25° C. of the high molecular polysiloxane compound is 40 to 90000 mm²/s, the number of modified groups per molecule of the low molecular polysiloxane compound is 0.1 to 3.0 and the number of modified groups per molecule of the high molecular polysiloxane compound is 1.0 to 10, and the number m of repetition of the polysiloxane unit in the low molecular polysiloxane compound and the number n of repetition of the polysiloxane unit in the high molecular polysiloxane compound satisfy the relation of:

$2m \leq n$ (see, e.g., PTL 2).

With the contamination inhibitor composition described above, the high molecular polysiloxane compound forms a film on the dry part to which the contamination inhibitor composition has been imparted, meanwhile the low molecular polysiloxane compound transfers to a wet paper and is conveyed by the wet paper, and is re-transferred to the dry part at the downstream side toward which the wet paper is guided, thus, the contamination inhibitor composition is imparted over a wide range of the dry part and pitch contamination can be inhibited effectively.

CITATION LIST

Patent Literature

PTL 1: Japanese Patent No. 4868628
PTL 2: Japanese Patent No. 4868629

SUMMARY OF INVENTION

Technical Problem

With the contamination inhibitor composition described in the above-mentioned PTL 2, however, pitch contamination cannot be necessarily inhibited sufficiently on a dry part particularly at the downstream side of travel of a wet paper, though the contamination inhibitor composition can be imparted over a wide range on the dry part.

That is, with the contamination inhibitor composition described in the above-mentioned PTL 2, when the low molecular polysiloxane compound is transferred to a wet paper, the compound tends to penetrate into the inside of the wet paper because of the low molecular weight. Then, there is a defect that even if the wet paper containing the low molecular polysiloxane compound comes into contact with a dry part at the downstream side of travel of the wet paper, a sufficient amount of the low molecular polysiloxane compound cannot be re-transferred.

The present invention has been accomplished in view of the above-described conditions, and has an object of providing a contamination inhibitor composition which can effectively inhibit pitch contamination on a dry part.

Solution to Problems

The present inventors have intensively studied to solve the above-described problems and resultantly found that the above-described problems can be solved by allowing a gelling agent having a prescribed structure to be contained in a contamination inhibitor composition, leading to completion of the present invention.

The present invention relates to (1) a contamination inhibitor composition which is imparted to a dry part of a paper-making machine, and comprising a film forming agent and a gelling agent, wherein the film forming agent is an emulsion consisting of water, a modified silicone and an emulsifier and the gelling agent is a compound represented by the following formula (1):

(Chemical Formula 1)

(1)

[in the formula (1), $R^1$ each independently represents a hydrogen atom, a hydroxyl group, a carboxyl group or a hydrocarbon group optionally having a substituent having 1 to 3 carbon atoms, $R^2$ each independently represents a hydroxyl group or a carboxyl group, $R^3$ represents a hydrogen atom, a hydroxyl group or a carboxyl group, m is an integer of 1 to 5, and n is an integer of 0 to 5.].

The present invention relates to (2) the contamination inhibitor composition according to the above-described (1), wherein n is an integer of 1 to 5.

The present invention relates to (3) the contamination inhibitor composition according to the above-described (1) or (2), wherein $R^1$ each independently represent a hydrogen atom, a hydroxyl group or a carboxyl group, and at least one of the $R^1$ is a hydroxyl group.

The present invention relates to (4) the contamination inhibitor composition according to any one of the above-described (1) to (3), wherein $R^2$ is a hydroxyl group.

The present invention relates to (5) the contamination inhibitor composition according to any one of the above-described (1) to (4), wherein the modified silicone is an amino-modified silicone having an amino group, a neutralizing agent for neutralizing the amino-modified silicone is further contained, and the neutralizing agent is acetic acid or lactic acid.

The present invention relates to (6) the contamination inhibitor composition according to any one of the above-described (1) to (5), wherein the number of a hydroxyl group in the gelling agent is larger than the number of a carboxyl group in the gelling agent.

The present invention relates to (7) the contamination inhibitor composition according to the above-described (1), wherein the gelling agent is at least one selected from the group consisting of gluconic acid, malic acid and citric acid.

The present invention relates to (8) the contamination inhibitor composition according to any one of the above-described (1) to (7), wherein the blending rate of the gelling agent with respect to 10% by mass of the modified silicone is 0.1 to 20% by mass.

The present invention relates to (9) the contamination inhibitor composition according to any one of the above-described (1) to (8), wherein the composition, after imparting to a dry part, is gelled by bringing a wet paper into contact with the dry part, and transferred to the wet paper.

Advantageous Effects of Invention

Since a gelling agent having a prescribed structure is contained in addition to a film forming agent composed of an emulsion in the contamination inhibitor composition of the present invention, when the composition is imparted to a dry part and heated and subsequently brought into contact with a wet paper having lower temperature, the contamination inhibitor composition is cooled and gelling occurs by the action of the gelling agent.

Though the reason for gelling of the contamination inhibitor composition by the gelling agent is not sure, it is guessed that gelling occurs by endowing the gelling agent with a structure with which an intermolecular hydrogen bond is formed easily and restricting the degree of freedom of the molecule of the gelling agent by cooling the contamination inhibitor composition. Here, the reason is not limited to this.

Since flowability of the contamination inhibitor composition lowers by gelling, penetration into the inside of a wet paper is inhibited.

Hence, when the contamination inhibitor composition of the present invention is imparted to a dry part at the most upstream side of travel of a wet paper, the contamination inhibitor composition is transferred to the wet paper from a dry part at the upstream side and re-transferred to a dry part at the downstream side from the wet paper, accordingly, a sufficient amount of the contamination inhibitor composition can be imparted not only to a dry part at the upstream side but also to a dry part at the downstream side. As a result, pitch contamination can be inhibited over a wide range of a dry part.

Further, with the contamination inhibitor composition of the present invention, restriction of the molecular weight of a modified silicone and the like to be used as in the contamination inhibitor composition described in cited literature 2 mentioned above is not present since the contamination inhibitor composition is gelled.

When n is an integer of 1 to 5 in the contamination inhibitor composition of the present invention, gelling can be promoted. That is, since $R^2$ as a hydroxyl group or a carboxyl group is surely present, the gelling agent easily forms an intermolecular hydrogen bond, thus, gelling is promoted.

When $R^1$ each independently represents a hydrogen atom, a hydroxyl group or a carboxyl group and at least one of the $R^1$ is a hydroxyl group in the contamination inhibitor composition of the present invention, the gelling agent easily forms an intermolecular hydrogen bond, thus, gelling can be promoted.

When $R^2$ is a hydroxyl group in the contamination inhibitor composition of the present invention, the gelling agent easily forms an intermolecular hydrogen bond, thus, gelling can be promoted.

When the modified silicone is an amino-modified silicone having an amino group and a neutralizing agent for neutralizing the amino-modified silicone is further contained in the contamination inhibitor composition of the present invention, the modified silicone is in the form of a neutralized salt, thus, polarity of the modified silicone itself can be enhanced. By this, the composition is infallibly gelled by the gelling agent, without separation of the modified silicone from water.

Further, by selecting acetic acid or lactic acid having a carboxyl group or a hydroxyl group as the neutralizing agent, an intermolecular hydrogen bond to the gelling agent can also be formed, thus, gelling can be further promoted.

In the contamination inhibitor composition of the present invention, it is preferable that the number of a hydroxyl group in the gelling agent is larger than the number of a carboxyl group. In this case, the gelling agent easily forms an intermolecular hydrogen bond, thus, gelling can be still further promoted.

When the gelling agent is at least one selected from the group consisting of gluconic acid, malic acid and citric acid in the contamination inhibitor composition of the present invention, the contamination inhibitor composition is gelled infallibly. By this, it becomes possible to infallibly inhibit pitch contamination on a dry part in a wider range.

When the blending rate of the gelling agent with respect to 10% by mass of a modified silicone is 0.1 to 20% by mass in the contamination inhibitor composition of the present invention, the effect of the gelling agent can be manifested sufficiently, and even if the contamination inhibitor composition is preserved for a long period of time, separation and the like do not occur, and excellent preservation stability is obtained.

When the contamination inhibitor composition of the present invention is imparted to a prescribed site of a dry part and subsequently a wet paper is brought into contact with the prescribed site, the contamination inhibitor composition is gelled and the gelled contamination inhibitor composition is transferred to the wet paper.

Thereafter, when the wet paper is brought into contact with a dry part at the downstream side, the contamination inhibitor composition is re-transferred to the contacted dry part.

If the dry part after re-transfer is a cylinder, the gelled contamination inhibitor composition is warmed and liquefied, and further, dried to form a film, since the cylinder is heated. Even a dry part other than a cylinder is heated in general by heat of friction with a wet paper.

As described above, pitch contamination on a dry part can be inhibited effectively.

DESCRIPTION OF EMBODIMENTS

Suitable embodiments of the present invention will be illustrated in detail below while referring to drawings if necessary. Positional relations such as up and down and left and right are based on positional relations shown in drawings unless otherwise stated. The dimension ratio of drawings is not limited to the ratio shown.

The contamination inhibitor composition according to the present invention can be imparted to a dry part of a papermaking machine to inhibit pitch contamination of the dry part.

Such a dry part includes a cylinder, a canvas, a canvas roll, a calender roll, a breaker stack roll and the like.

The contamination inhibitor composition comprises a film forming agent and a gelling agent.

The film forming agent is an emulsion consisting of water, a modified silicone and an emulsifier. That is, the film forming agent is obtained by mixing a modified silicone and water and emulsifying the mixture with an emulsifier.

Here, the modified silicone includes an amino-modified silicone, an epoxy-modified silicone, a polyether-modified silicone, an alkyl-modified silicone, a carboxyl-modified silicone, an epoxy.polyether-modified silicone and the like. These may be used each singly or some of them may be mixed.

Of them, the modified silicone is more preferably an amino-modified silicone from the standpoint of general versatility.

When the modified silicone is an amino-modified silicone, it is preferable that the contamination inhibitor composition further contains a neutralizing agent for neutralizing the amino-modified silicone since the contamination inhibitor composition is basic.

In this case, polarity of the amino-modified silicone itself can be enhanced since the amino-modified silicone becomes a neutralized salt. By this, the composition is gelled infallibly by the gelling agent without separation of the amino-modified silicone from water.

Here, the neutralizing agent is not particularly restricted, and includes acetic acid, malic acid, citric acid, lactic acid and the like.

Of them, acetic acid or lactic acid is preferable as the neutralizing agent from the standpoint of safety and general versatility.

When the neutralizing agent is acetic acid or lactic acid, it is also possible to form an intermolecular hydrogen bond to a carboxyl group or a hydroxyl group in the gelling agent described later since acetic acid or lactic acid has a carboxyl group or a hydroxyl group in the molecule, therefore, gelling can be further promoted.

In the film forming agent, the emulsifier is not particularly restricted, and known nonionic surfactants, anionic surfactants, cationic surfactants, ampholytic surfactants and the like are used.

Of them, nonionic surfactants are preferable as the emulsifier.

The nonionic surfactant includes polyoxyethylene alkyl ether, polyoxyethylene alkyl thioether, polyoxyethylene fatty acid ester, polyoxyethylene sorbitan mono fatty acid ester, glycerin mono fatty acid ester and the like. These may be used each singly or some of them may be mixed.

Of them, polyoxyethylene alkyl ether is preferable, and further, polyoxyethylene decyl ether, polyoxyethylene undecyl ether, polyoxyethylene cetyl ether or polyoxyethylene stearyl ether is more preferable as the nonionic surfactant, from the standpoint of emulsification stability of the modified silicone.

In the contamination inhibitor composition, the gelling agent is a compound represented by the following formula (1).

[Chemical Formula 2]

(1)

The formula (1) has a structure in which the main chain is composed of carbons having a number of repetition of in and carbons having a number of repetition of n in which a hydrogen atom, a carboxyl group, $R^1$ (group) and $R^3$ (group) are bonded to the carbons having a number of repetition of m and a hydrogen atom and $R^2$ (group) are bonded to the carbons having a number of repetition of n.

Here, groups $R^1$ are each independent. Namely, when a plurality of $R^1$ are contained in the molecule, adjacent $R^1$ may be the same or different.

$R^1$ each independently represents a hydrogen atom, a hydroxyl group, a carboxyl group or a hydrocarbon group optionally having a substituent having 1 to 3 carbon atoms.

The substituent of the hydrocarbon group optionally having a substituent represented by $R^1$ is not particularly restricted, and includes, for example, a halogen group, a hydroxyl group, an amino group, an imino group, a nitro group, an azo group, an oxo group, a carboxyl group, a phenyl group and the like.

It is preferable that $R^1$ each independently represents a hydrogen atom, a hydroxyl group or a carboxyl group, of them.

When $R^1$ is a hydrogen atom, an intermolecular hydrogen bond between molecules of the gelling agent is not disturbed since a hydrogen atom does not cause steric hindrance.

When $R^1$ is a hydroxyl group or a carboxyl group, itself forms an intermolecular hydrogen bond to a hydroxyl group or a carboxyl group of the other molecule.

It is preferable that at least one of $R^1$ is a hydroxyl group. In this case, an intermolecular hydrogen bond is formed easily, thus, gelling can be promoted.

In the formula (1), the number m of repetition of carbon atoms bonding to $R^1$ is an integer of 1 to 5.

When the number m of repetition is over 5, there is a detect that if $R^1$ is a hydrogen atom or a hydrocarbon group optionally having a substituent, hydrophobicity increases, and resultantly, the preservation stability of the contamination inhibitor composition lowers.

In the formula (1), groups $R^2$ are each independent. Namely, when a plurality of $R^2$ are contained in the molecule, adjacent $R^2$ may be the same or different.

$R^2$ each independently represents a hydroxyl group or a carboxyl group.

$R^2$ is preferably a hydroxyl group, of them. In this case, an intermolecular hydrogen bond can be formed easily, thus, gelling can be more promoted.

In the formula (1), the number n of repetition of carbon atoms bonding to $R^2$ is an integer of 0 to 5.

When the number n of repetition is over 5, gelling becomes excessive, and resultantly, there is a possibility that uniform imparting to a dry part is impossible.

When n is 0, the gelling agent is a compound as represented by the following formula (2). In the formula (2), $R^1$, $R^3$ and m have the same definition as $R^1$, $R^3$ and m in the formula (1).

(Chemical Formula 3)

(2)

In the formula (1), the number n of repetition is preferably an integer of 1 to 5.

When the number n of repetition is an integer of 1 to 5, gelling can be promoted. That is, an intermolecular hydrogen bond is formed easily since the gelling agent surely has $R^2$ as a hydroxyl group or a carboxyl group, and resultantly, gelling is also promoted.

In the formula (1), $R^3$ represents a hydrogen atom, a hydroxyl group or a carboxyl group.

It is preferable that $R^3$ represents a hydroxyl group or a carboxyl group, of them. In this case, an intermolecular hydrogen bond is formed more easily, thus, gelling can be more promoted.

In the gelling agent, it is preferable that the number of a hydroxyl group is larger than the number of a carboxyl group. In this case, acidity is not enhanced and the gelling agent easily forms an intermolecular hydrogen bond, thus, gelling can be still more promoted.

Specifically, the number of a hydroxyl group is preferably 2 times or more, more preferably 2 to 5 times of the number of a carboxyl group. When over 5 times, an improvement in the effect is hard to be recognized.

Specific examples of the gelling agent include, for example, organic acids such as gluconic acid, malic acid, citric acid, succinic acid, propionic acid, butyric acid, valeric acid, caproic acid and the like. These may be used each singly or some of them may be mixed.

Of them, at least one selected from the group consisting of gluconic acid, malic acid and citric acid is preferable and gluconic acid is further preferable, as the gelling agent. In this case, the contamination inhibitor composition can be gelled infallibly. Further, the contamination inhibitor composition is also excellent in preservation stability.

In the contamination inhibitor composition, the blending rate of the gelling agent with respective to 10% by mass of a modified silicone is preferably 0.1% by mass to 20% by mass, more preferably 0.1% by mass to 5% by mass.

When the blending rate of the gelling agent with respective to 10% by mass of a modified silicone is less than 0.1% by mass, there is a defect that gelling is not recognized as sufficient and the amount of the contamination inhibitor composition to be re-transferred becomes smaller, as compared with the case in which the blending rate of the gelling agent is within the above-described range, while when the blending rate of the gelling agent with respective to 10% by mass of a modified silicone is over 20% by mass, the contamination inhibitor composition is gelled depending on preservation conditions in some cases and preservation stability is not recognized as excellent, as compared with the case in which the blending rate of the gelling agent is within the above-described range.

In the contamination inhibitor composition, additive such as a chelating agent, an antiseptic agent, a dispersing agent, a viscosity modifier, a solid lubricant agent, a lubricant agent, a dusting inhibitor, a releasing agent, an adhesive agent, a surface correcting agent, a cleaning agent, a paper strength enhancing agent, a sizing agent, a yield improver, a water repellent agent, an oil repellent agent, an antislip agent, a softening agent and the like may be contained.

In the production method of the contamination inhibitor composition according to the present embodiment, first, a modified silicone and an emulsifier are added to water, and the mixture is processed into an emulsion by known methods such as a method using a vacuum emulsification and stirring apparatus, and the like.

Then, the gelling agent is added to the emulsion, and if necessary, additives are added, and these are again stirred and mixed, thus, the contamination inhibitor composition is obtained.

For such stirring and mixing, a hand mixer, a homogenizer and the like are suitably used. Materials may be dispersed by a disperser such as a sand mill, a bead mill, a ball mill and the like.

As described above, the contamination inhibitor composition is obtained.

Next, the action of the contamination inhibitor composition will be illustrated using an example in which the contamination inhibitor composition according to the present invention is imparted to a cylinder as a dry part.

FIGS. 1(a) to (e) are explanation views for illustrating the action of the contamination inhibitor composition according to the present invention.

Figure 1:
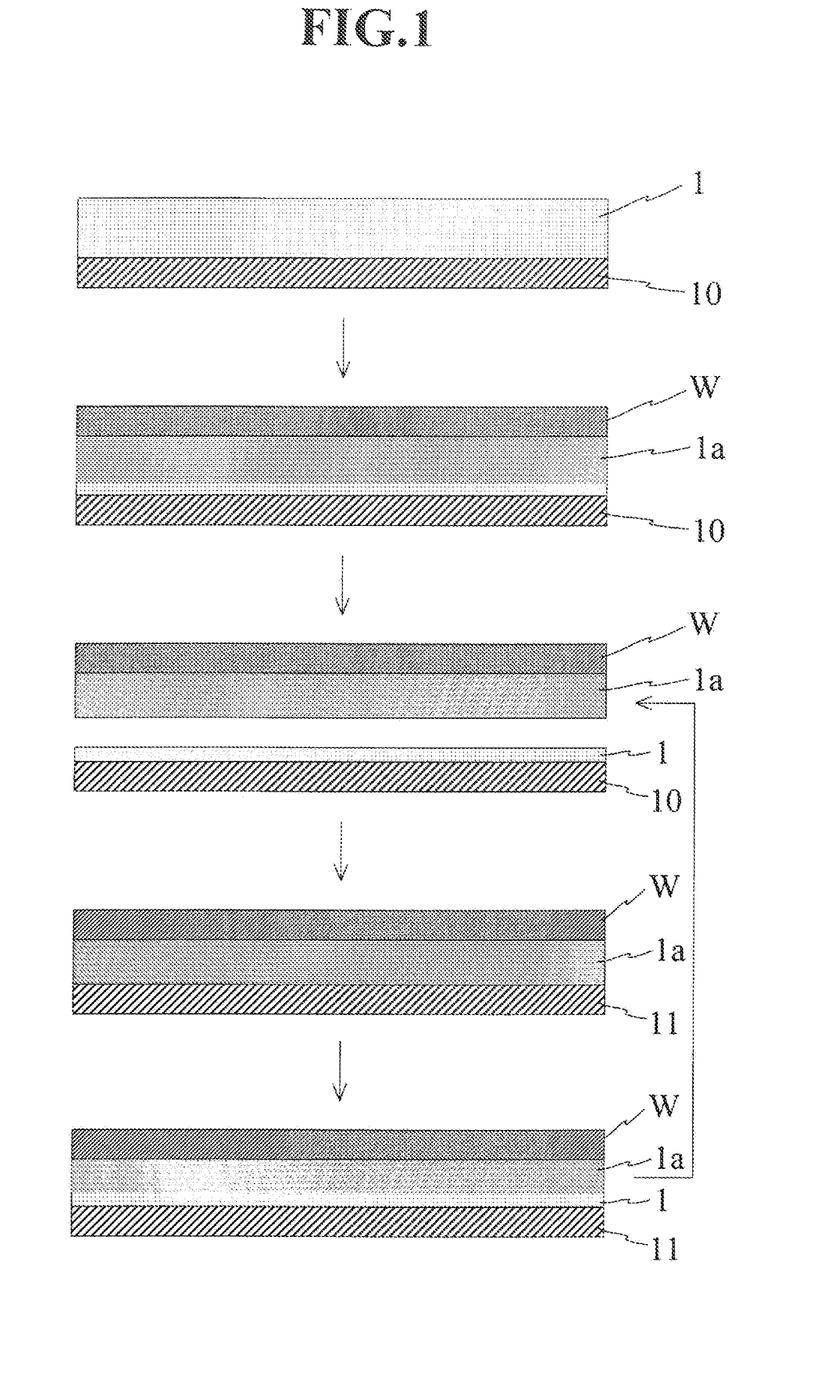
FIGS. 1(a) to (e) are explanation views for illustrating the action of the contamination inhibitor composition according to the present invention.

As shown in FIG. 1(a), a contamination inhibitor composition 1 is imparted to a cylinder 10.

In this situation, the cylinder 10 has high temperature since the cylinder is a dry part for drying a wet paper W. For this reason, the imparted contamination inhibitor composition 1 is heated to high temperature (about 65° C. or higher) and a part of water vaporizes and the composition is concentrated. Also a dry part other than the cylinder 10 is heated to high temperature by friction due to travel of a wet paper.

Next, as shown in FIG. 1(b), when the cylinder 10 travels (revolve) and the contamination inhibitor composition 1 comes into contact with the wet paper W having temperature (about 30 to 40° C.) lower than the cylinder 10, the side of the contamination inhibitor composition 1 in contact with the wet paper W is cooled and gelled, to give a gelled product 1a.

Then, as shown in FIG. 1(c), a part of the gelled product 1a composed of the contamination inhibitor composition 1 transfers to the wet paper W.

Since the contamination inhibitor composition 1 is the gelled product 1a, the composition remains on the surface of the wet paper W, and penetration into the inside thereof is inhibited.

On the cylinder 10, pitch contamination is inhibited, since the remaining contamination inhibitor composition 1 forms a film.

Next, the wet paper W carrying the transferred gelled product 1a travels to the downstream side.

As shown in FIG. 1(d), when the wet paper W carrying the transferred gelled product 1a comes into contact with a cylinder 11 at the downstream side, the gelled product 1a is heated by the cylinder 11 at the downstream side, and partially liquefied as shown in FIG. 1(e).

By this, the contamination inhibitor composition 1 is re-transferred from the wet paper W to the cylinder 11 at the downstream side. Since the gelled product 1a is liquefied in sequence from the surface in contact with the cylinder 11 at the downstream side, all of it is not liquefied.

By repetition of this operation, the contamination inhibitor composition 1 is re-transferred in turn to the dry part at the downstream side toward which the wet paper W is guided.

With the contamination inhibitor composition 1 according to the present embodiment, as described above, the contamination inhibitor composition 1 transferred to the wet paper W is gelled to give a gelled product 1a, and flowability of the contamination inhibitor composition lowers, thus, penetration into the inside of the wet paper W can be inhibited.

Further, for example, when the contamination inhibitor composition is imparted to a dry part at the most upstream side of travel of the wet paper W, a sufficient amount of the contamination inhibitor composition can be imparted not only to the dry part at the upstream side but also to the dry part at the downstream side.

As a result, pitch contamination can be inhibited over a wide range of the dry part.

Next, the use method of the contamination inhibitor composition at a dry part will be illustrated.

Figure 2:
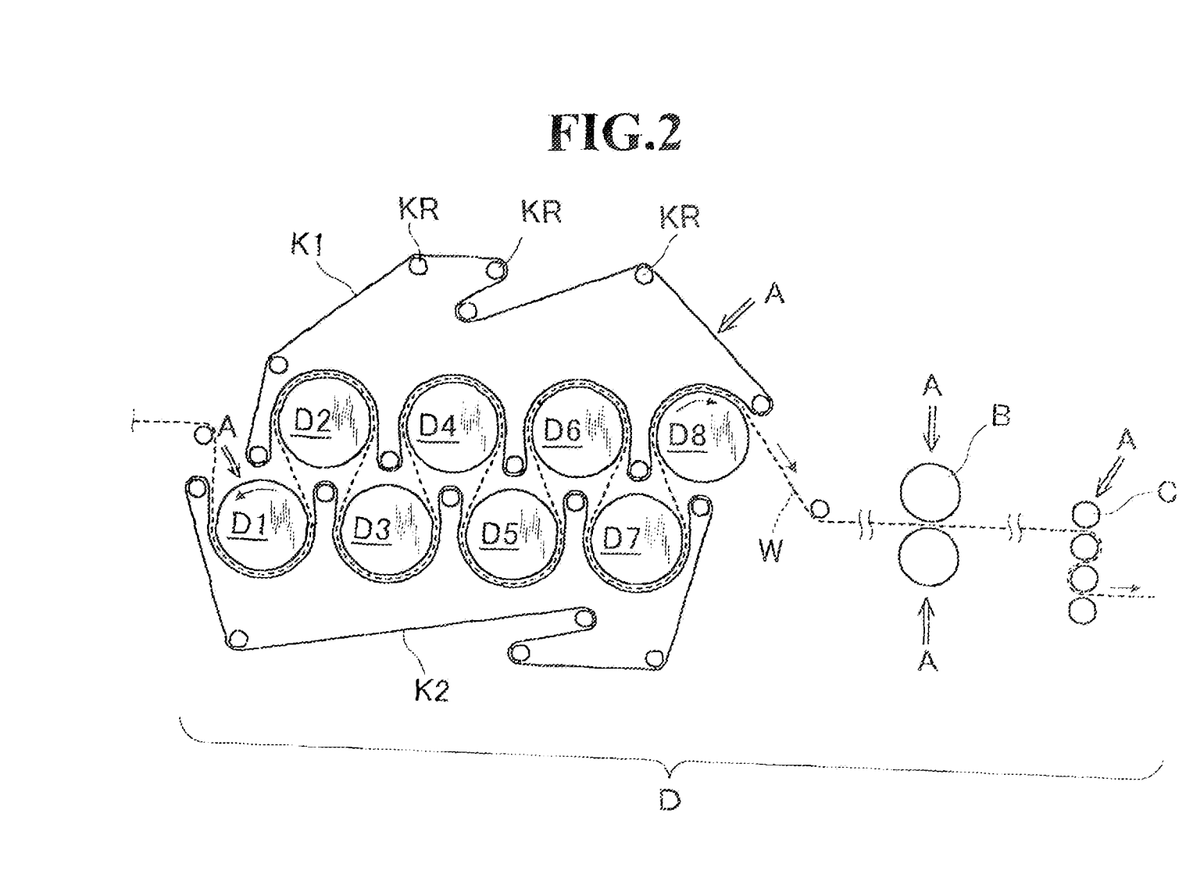
FIG. 2 is a schematic view showing a dry part using the contamination inhibitor composition according to the present invention.

FIG. 2 is a schematic view showing a dry part using the contamination inhibitor composition according to the present invention.

As shown in FIG. 2, the contamination inhibitor composition is used on a dry part D.

The dry part D has a wet paper W, a plurality of cylindrical cylinders D1, D2, D3, D4, D5, D6, D7 and D8 (hereinafter, referred to as "D1 to D8") for heating and drying the wet paper W, canvases K1, K2 for pressing the wet paper to the cylinders D1 to D8, canvas rolls KR for guiding the canvases K1, K2, breaker stack rolls B for mildly controlling the thickness and the smoothness of the dried wet paper W, and calender rolls C for controlling the thickness and the smoothness of the dried wet paper W.

In the dry part D, the wet paper W is pressed and contacted to the surfaces of the revolving cylinders D1 to D8 by the canvases K1, K2. By this, the wet paper W adheres to the cylinders D1 to D8, and simultaneously, is heated and dried.

Thereafter, the wet paper W is sandwiched between the breaker stack rolls B, then, the wet paper W is densified by the calender rolls C.

In the use method of the contamination inhibitor composition, the contamination inhibitor composition is imparted to the cylinders D1 to D8 of the dry part D, the canvases K1, K2, the breaker stack rolls B and the calender rolls C, respectively, at the positions of arrows A, as shown in FIG. 2.

The imparting method of the contamination inhibitor composition is not particularly restricted, and for example, a shower mode and an atomizing mode using a spray nozzle and the like are used.

When the contamination inhibitor composition is imparted at the positions of arrows A, the apparatuses travel (revolve) to guide the wet paper, and the contamination inhibitor composition transfers to the wet paper as described above.

The contamination inhibitor composition is conveyed by the wet paper, and re-transferred to a dry part at the downstream side toward which the wet paper is guided.

By this, the contamination inhibitor composition is imparted totally to the apparatuses, and pitch contamination can be inhibited.

In this condition, the spray amount of the contamination inhibitor composition is preferably 0.02 mg/m$^2$ to 2.0 mg/m$^2$ in terms of the non-volatile matter amount per passing area of the wet paper.

When the spray amount is less than 0.02 mg/m$^2$, the contamination inhibitor composition does not adhere sufficiently to the surfaces of the apparatuses and pitch contamination cannot be inhibited sufficiently in some cases, as compared with the case in which the spray amount is within the above-described range. In contrast, when the spray amount is over 2.0 mg/m$^2$, the contamination inhibitor composition possibly causes contamination, as compared with the case in which the spray amount is within the above-described range.

Suitable embodiments of the present invention have been explained above, but the present invention is not limited to the above-described embodiments.

Though the contamination inhibitor composition according to the present embodiment is imparted to a dry par, it is also possible to apply the composition not only to a dry part but also to a press part and a reel part.

EXAMPLES

The present invention will be illustrated more specifically based on examples and comparative example below, but the present invention is not limited to the following examples.

Example and Comparative Example

Ten (10) parts by mass of an amino-modified silicone and a gelling agent having the blending rate shown in Table 1 below were mixed, to prepare samples A heated at 100° C.

(Evaluation 1)

A dried paper was placed on a stainless-steel plate heated at 40° C.

Then, 10 μL of the sample A was dropped from above the paper, and the time until the sample A penetrate into the paper was measured. Penetration or no-penetration was judged visually.

The resultant results are shown in Table 1. Longer the time of penetration into the paper, the better the evaluation.

TABLE 1

| | Modified silicone | Gelling agent | Blending rate (%) | Penetration time (s) |
|---|---|---|---|---|
| Example 1 | Amino-modified silicone | Gluconic acid | 0.1 | 350 |
| Example 2 | Amino-modified silicone | Gluconic acid | 0.4 | 450 |
| Example 3 | Amino-modified silicone | Gluconic acid | 1 | 500 |
| Example 4 | Amino-modified silicone | Gluconic acid | 2 | 500 |
| Example 5 | Amino-modified silicone | Gluconic acid | 20 | 200 |
| Example 6 | Amino-modified silicone | Gluconic acid | 21 | 100 |
| Example 7 | Amino-modified silicone | Citric acid | 0.1 | 300 |
| Example 8 | Amino-modified silicone | Citric acid | 0.4 | 350 |
| Example 9 | Amino-modified silicone | Citric acid | 1 | 400 |
| Example 10 | Amino-modified silicone | Citric acid | 2 | 500 |
| Example 11 | Amino-modified silicone | Citric acid | 20 | 200 |
| Example 12 | Amino-modified silicone | Citric acid | 21 | 100 |
| Example 13 | Amino-modified silicone | Malic acid | 0.1 | 300 |
| Example 14 | Amino-modified silicone | Malic acid | 0.4 | 350 |
| Example 15 | Amino-modified silicone | Malic acid | 1 | 350 |
| Example 16 | Amino-modified silicone | Malic acid | 2 | 400 |
| Example 17 | Amino-modified silicone | Malic acid | 20 | 200 |
| Example 18 | Amino-modified silicone | Malic acid | 21 | 100 |
| Comparative Example 1 | Amino-modified silicone | None | 0 | 90 |

(Evaluation 2)

To the respective samples A of Example 3 and Comparative Example 1 was added 90 parts by mass of water, to obtain samples B.

The effect of the contamination inhibitor composition on an actual equipment was checked.

Specifically, a paper-making machine was driven, and the samples B were imparted using a spray nozzle to the positions of arrows A on cylinders D1 to D8 shown in FIG. 2.

Three hours after, extent of contamination of the cylinder D2, the cylinder D4 and the cylinder D6 was visually confirmed.

The resultant results are shown in Table 2. In Table 2, "○" denotes a condition of no pitch contamination and "×" denotes a condition in which pitch contamination was recognized.

TABLE 2

| | Spray amount (cc/min) | Cylinder D2 | Cylinder D4 | Cylinder D6 |
|---|---|---|---|---|
| Example 3 | 6.9 | ○ | ○ | ○ |
| | 10 | ○ | ○ | ○ |
| Comparative Example 1 | 6.9 | ○ | × | × |
| | 10 | ○ | × | × |

According to the above-described results, it was found that the contamination inhibitor composition of the present invention containing a gelling agent is hard to penetrate into a paper as compared with conventional contamination inhibitor compositions containing no gelling agent.

As a result of the test using an actual equipment, it was confirmed that the contamination inhibitor composition of the present invention can inhibit pitch contamination sufficiently also on a cylinder at the downstream side.

INDUSTRIAL APPLICABILITY

The contamination inhibitor composition of the present invention is imparted to a dry part in a paper-making machine. According to the contamination inhibitor composition of the present invention, yield in paper production can be extremely improved since pitch contamination on a dry part can be inhibited by the composition.

REFERENCE SIGNS LIST

1 . . . contamination inhibitor composition,
1a . . . gelled product,
10, 11 . . . cylinder,
B . . . breaker stack roll,
C . . . calender roll,
D . . . dry part,
D1, D2, D3, D4, D5, D6, D7, D8 . . . cylinder,
K1, K2 . . . canvas,
KR . . . canvas roll,
KR1 . . . out roll,
W . . . wet paper

The invention claimed is:

1. A contamination inhibitor composition which is imparted to a dry part of a paper-making machine,
   and comprising a film forming agent and a gelling agent,
   wherein said film forming agent is an emulsion consisting of water, a modified silicone and an emulsifier,
   said gelling agent is at least one selected from the group consisting of gluconic acid, malic acid and citric acid, and
   the emulsifier is at least one selected from the group consisting of a nonionic surfactant, an anionic surfactant, a cationic surfactant and an ampholytic surfactant,
   wherein said modified silicone is an amino-modified silicone having an amino group, a neutralizing agent for neutralizing the amino-modified silicone is further contained, and the neutralizing agent is acetic acid or lactic acid.

2. The contamination inhibitor composition according to claim 1, wherein said gelling agent is gluconic acid.

3. The contamination inhibitor composition according to claim 1, wherein a blending ratio is a ratio of a mass of the gelling agent to a mass of the modified silicone, and a range of said blending ratio is 0.01 to 2.

4. A contamination inhibitor composition which is imparted to a dry part of a paper-making machine,
   and comprising a film forming agent and a gelling agent,
   wherein said film forming agent is an emulsion consisting of water, a modified silicone and an emulsifier,
   said gelling agent is at least one selected from the group consisting of gluconic acid, malic acid and citric acid, and
   the emulsifier is at least one selected from the group consisting of a nonionic surfactant, an anionic surfactant, a cationic surfactant and an ampholytic surfactant,
   wherein said modified silicone is an amino-modified silicone having an amino group, a neutralizing agent for neutralizing the amino-modified silicone is further contained, and the neutralizing agent is acetic acid or lactic acid, wherein a blending ratio is a ratio of a mass of the gelling agent to a mass of the amino-modified silicone, and a range of said blending ratio is 0.01 to 0.02.

5. The contamination inhibitor composition according to claim 4, wherein said gelling agent is gluconic acid.

* * * * *